United States Patent
Xie et al.

(10) Patent No.: US 11,294,660 B2
(45) Date of Patent: Apr. 5, 2022

(54) APPARATUS AND METHOD FOR CONFIGURING OR UPDATING PROGRAMMABLE LOGIC DEVICE

(71) Applicant: INSTITUTE OF MICROELECTRONICS, CHINESE ACADEMY OF SCIENCES, Beijing (CN)

(72) Inventors: Yuanlu Xie, Beijing (CN); Kun Zhang, Beijing (CN); Haitao Sun, Beijing (CN); Jing Liu, Beijing (CN); Jinshun Bi, Beijing (CN); Ming Liu, Beijing (CN)

(73) Assignee: Institute of Microelectronics, Chinese Academy of Sciences

( * ) Notice: Subject to any disclaimer, the term of this patent is extended or adjusted under 35 U.S.C. 154(b) by 223 days.

(21) Appl. No.: 16/337,978

(22) PCT Filed: Apr. 21, 2017

(86) PCT No.: PCT/CN2017/081355
§ 371 (c)(1),
(2) Date: Mar. 29, 2019

(87) PCT Pub. No.: WO2018/064885
PCT Pub. Date: Apr. 12, 2018

(65) Prior Publication Data
US 2019/0235858 A1    Aug. 1, 2019

(30) Foreign Application Priority Data
Oct. 8, 2016   (CN) .......................... 201610879153.7

(51) Int. Cl.
*G06F 8/654*    (2018.01)
*G06F 1/3296*   (2019.01)
(Continued)

(52) U.S. Cl.
CPC ............ *G06F 8/654* (2018.02); *G06F 1/3296* (2013.01); *G06F 8/71* (2013.01); *G06F 13/4282* (2013.01)

(58) Field of Classification Search
CPC ... G06F 8/61; G06F 8/65; G06F 8/654; G06F 13/4282; G06F 1/3296
See application file for complete search history.

(56) References Cited

U.S. PATENT DOCUMENTS 5,159,598 A * 10/1992 Welles, II ...... G01R 31/318533
714/724
6,629,311 B1 * 9/2003 Turner .................... G06F 30/34
326/38
(Continued)

FOREIGN PATENT DOCUMENTS

| CN | 101826025 | 9/2010 |
| CN | 103309693 | 9/2013 |

(Continued)

OTHER PUBLICATIONS

Rscasny. "FPGAs: structure, elements and configuration." Element14, Feb. 18, 2018, www.element14.com/community/groups/fpga-group/blog/2018/02/18/fpgas-structure-elements-and-configuration. Accessed Sep. 30, 2021. (Year: 2018).*

(Continued)

*Primary Examiner* — Qing Chen
(74) *Attorney, Agent, or Firm* — GoodwinProcter LLP

(57) ABSTRACT

An apparatus and a method for configuring or updating a programmable logic device are provided. The apparatus includes a control module and a storage module connected to the control module. The control module includes: a JTAG interface for connecting the control module to a JTAG host, and a configuration interface compatible with a to-be-configured programmable logic device. The control module is configured to: after receiving a first control instruction (Continued)

including configuration information via the JTAG interface, store the configuration information into the storage module; and after receiving a configuration instruction, read the configuration information to configure the to-be-configured programmable logic device. A configuration clock used in a process that the control module configures the to-be-configured programmable logic device is generated from the to-be-configured programmable logic device, the control module or an external clock source.

13 Claims, 7 Drawing Sheets

(51) Int. Cl.
*G06F 13/42* (2006.01)
*G06F 8/71* (2018.01)

(56) References Cited

U.S. PATENT DOCUMENTS

| | | | | |
|---|---|---|---|---|
| 7,078,929 | B1 * | 7/2006 | Draper | G01R 31/318555 326/16 |
| 7,236,000 | B1 * | 6/2007 | Steiner | H03K 19/0033 326/10 |
| 7,302,562 | B1 * | 11/2007 | Jacobson | G06F 8/65 713/100 |
| 7,389,489 | B1 * | 6/2008 | Chesal | G06F 30/34 716/103 |
| 7,589,558 | B1 * | 9/2009 | Tseng | G06F 30/34 326/41 |
| 7,626,415 | B1 * | 12/2009 | Tseng | G11C 11/4125 326/38 |
| 8,700,957 | B2 * | 4/2014 | La Fever | G06F 21/577 714/30 |
| 8,793,556 | B1 * | 7/2014 | Northcott | G06F 11/1068 714/773 |
| 9,679,232 | B2 * | 6/2017 | Shimizu | G06K 15/408 |
| 10,347,330 | B2 * | 7/2019 | Zeng | G06F 11/1048 |
| 2011/0307647 | A1 * | 12/2011 | Stalzer | G06F 12/0866 711/103 |
| 2014/0118026 | A1 * | 5/2014 | Aldragen | G11C 8/00 326/41 |
| 2015/0188580 | A1 * | 7/2015 | Tang | H03K 19/23 714/752 |
| 2019/0042227 | A1 * | 2/2019 | Sharma | B64C 39/02 |

FOREIGN PATENT DOCUMENTS

| | | |
|---|---|---|
| CN | 103777972 | 5/2014 |
| CN | 104049995 | 9/2014 |
| CN | 104050006 | 9/2014 |
| CN | 106445544 | 2/2017 |

OTHER PUBLICATIONS

International Search Report, PCT/CN2017/081355, dated Jul. 28, 2017.

* cited by examiner

APPARATUS AND METHOD FOR CONFIGURING OR UPDATING PROGRAMMABLE LOGIC DEVICE

The present application is the national phase of PCT International Patent Application PCT/CN2017/081355, filed on Apr. 21, 2017, which claims the priority to Chinese Patent Application No. 201610879153.7, titled "APPARATUS AND METHOD FOR CONFIGURING OR UPDATING PROGRAMMABLE LOGIC DEVICE," filed on Oct. 8, 2016 with the Chinese Patent Office, both of which are incorporated herein by reference in their entireties.

FIELD

The present disclosure relates to the technical field of programmable logic devices and configuration program memories thereof, and particularly to an apparatus and a method for configuring or updating a programmable logic device.

BACKGROUND

Programmable Logic Devices (PLDs) such as Field-Programmable Gate Array (FPGAs) are widely applied in various fields. Taking an FPGA as an example, functions performed by the FPGA are determined by internal configuration information therein. For a common FPGA based on a Static Random Access Memory (SRAM), the configuration information is stored in an on-chip SRAM unit. Once the FPGA is powered down, the configuration information stored in the SRAM is lost. Therefore, nonvolatile storage is required to be performed on the configuration information required by the FPGA by using an off-chip nonvolatile memory such as a PROM or an EEPROM. After the system is powered on, the configuration information is transmitted to the FPGA for configuration or update.

For FPGAs (which are referred to as small capacity FPGAs or small capacity programmable logic devices) requiring less than or equal to 32 Mbit of configuration information, the FPGA manufacturer provides configuration memory chips matching with the FPGAs to perform load configuration on the configuration information of the FPGAs. The memory chips include XCF01S having a storage capacity of 1 Mbit, XCF02S having a storage capacity of 2 Mbit, XCF04S and XQ18V04 having a storage capacity of 4 Mbit, XC17V08 and XCF08P having a storage capacity of 8 Mbit, XC17V16, XCF16P and XQR17V16 having a storage capacity of 16 Mbit, and XCF32P and XQF32P having a storage capacity of 32 Mbit, and the like. The interface of each of these types of memory chips is compatible with the configuration interface of the FPGA chip, so that a JTAG host can perform operations such as reading, erasing and writing on data in the FPGA chip, and the FPGA can be configured or updated conveniently and quickly.

With the continuous development of FPGAs, there are some FPGAs requiring a large capacity of configuration information. For a FPGA (which is referred to as a large capacity FGPA or a large capacity programmable logic device) requiring more than 32 Mbit of configuration information, memories such as an SPI Flash memory, a BPI PROM, or a Platform Flash XL memory are required to configure the FPGA. The interface of each of these types of memories differs greatly from the interfaces of memories provided for the small capacity FPGAs, which results in poor usability of these types of memories when configuring the FPGA. In addition, adopting multiple memories each having a storage capacity less than or equal to 32 Mbit to configure the FPGA results in problems such as a large number of circuit components and a large occupied area of a circuit board.

Therefore, it is desired to provide an apparatus that can be used to configure or update a programmable logic device requiring more than 32 Mbit of configuration information and can be compatible with a conventional configuration interface.

SUMMARY

In order to solve the above technical problems, an apparatus and a method for configuring or updating a programmable logic device are provided in the present disclosure, to achieve an object of providing an apparatus that can be used to configure or update a programmable logic device requiring more than 32 Mbit of configuration information and can be compatible with a conventional configuration interface.

In order to achieve the above technical object, the following technical solutions are provided in the present disclosure.

An apparatus for configuring or updating a programmable logic device is provided. The apparatus includes: a control module and a storage module connected to the control module, where the control module includes: a JTAG interface for connecting the control module to a JTAG host, and a configuration interface compatible with a to-be-configured programmable logic device;

the control module is configured to: after receiving a first control instruction including configuration information via the JTAG interface, store the configuration information into the storage module; and after receiving a configuration instruction, read the configuration information to configure the to-be-configured programmable logic device; and a configuration clock used in a process that the control module configures the to-be-configured programmable logic device is generated from the to-be-configured programmable logic device or the control module or an external clock source.

Optionally, the control module is further configured to perform a reading or erasing operation on the storage module in response to a second control instruction sent by the JTAG host.

Optionally, the control module further includes a communication interface for connecting the control module to an upper computer, and the control module is further configured to: after receiving a third control instruction sent by the upper computer, perform storing, reading and erasing operations on the storage module in response to the third control instruction.

Optionally, the communication interface is implemented by an SPI bus interface or an IIC bus interface or a UART bus interface.

Optionally, the storage module includes three storage units. The control module is configured to perform a same operation on the storage units. The control module further includes a triple modular redundancy voting circuit. The triple modular redundancy voting circuit is configured to: perform a triple modular redundancy operation on data outputted by the three storage units, and output mostly same data in the data outputted by the three storage units as a reading result of the control module.

Optionally, each of the storage units is implemented by an SPI Flash memory or a BPI Flash memory or an NAND Flash memory or a programmable read-only memory PROM.

Optionally, the control module is further configured to: after receiving a configuration completion signal transmitted by the to-be-configured programmable logic device, control the storage module to operate in a low power mode or an idle mode.

Optionally, the apparatus further includes an encapsulation structure configured to encapsulate the storage module and the control module.

Optionally, the control module is implemented by an ASIC chip or a CPLD chip.

A method for configuring or updating a programmable logic device is further provided, by which the apparatus for configuring or updating a programmable logic device described above configures and updates a to-be-configured programmable logic device.

As can be seen from the above technical solutions, an apparatus and a method for configuring or updating a programmable logic device are provided according embodiments of the present disclosure. The apparatus for configuring or updating a programmable logic device includes a control module and a storage module connected to the control module. After the control module receives a first control instruction including configuration information via a JTAG interface, the control module stores the configuration information into the storage module. Since a configuration interface of the control module is compatible with a configuration interface of the to-be-configured programmable logic device, the configuration information read by the control module can be converted into configuration information compatible with a configuration timing of the to-be-configured programmable logic device and is then transmitted to the to-be-configured programmable logic device, to configure the to-be-configured programmable logic device, thereby solving the problem of poor usability of a to-be-configured programmable logic device having a large capacity in the conventional technology, which is caused due to a large difference between an interface of a memory used for configuring or updating the to-be-configured programmable logic device having a large capacity and a conventional configuration interface.

Further, with the apparatus for configuring or updating a programmable logic device, multiple memories each having a storage capacity less than or equal to 32 Mbit are not required in a process that the to-be-configured programmable logic device is configured or updated, thereby solving the problems of a large number of circuit components, a complicated circuit structure, a large occupied area of a circuit board, and a large weight of a system.

BRIEF DESCRIPTION OF THE DRAWINGS

In order to more clearly illustrate technical solutions in the embodiments of the present disclosure or in the conventional technology, the drawings used in the description of the embodiments or the conventional technology are briefly described hereinafter. Apparently, the drawings in the following description show only some embodiments of the present disclosure, and other drawings may be obtained by those skilled in the art from the drawings without any creative work.

DETAILED DESCRIPTION

Technical solutions in embodiments of the present disclosure are clearly and completely described in conjunction with the drawings in the embodiments of the present disclosure. Apparently, the described embodiments are only some embodiments of the present disclosure, rather than all embodiments. All other embodiments obtained by those skilled in the art based on the embodiments of the present disclosure without creative work fall within the protection scope of the present disclosure.

Figure 1:
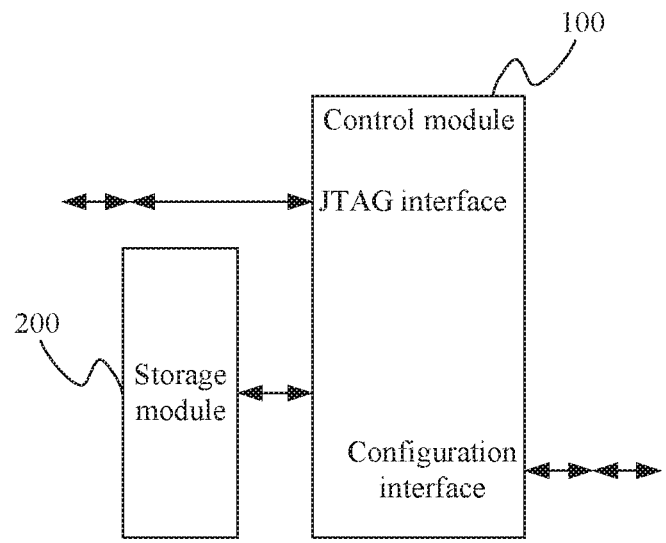
FIG. 1 is a schematic structural diagram of an apparatus for configuring or updating a programmable logic device according to an embodiment of the present disclosure.

An apparatus for configuring or updating a programmable logic device is provided according to an embodiment of the present disclosure. As shown in FIG. 1, the apparatus includes a control module 100, and a storage module 200 connected to the control module 100.

The control module 100 includes: a JTAG interface for connecting the control module to a JTAG host, and a configuration interface compatible with a to-be-configured programmable logic device.

The control module 100 is configured to: after receiving a first control instruction including configuration information via the JTAG interface, store the configuration information into the storage module 200; and after receiving a configuration instruction, read the configuration information to configure the to-be-configured programmable logic device.

A configuration clock used in a process that the control module 100 configures the to-be-configured programmable logic device is generated from the to-be-configured programmable logic device, the control module 100, or an external clock source.

Figure 2:
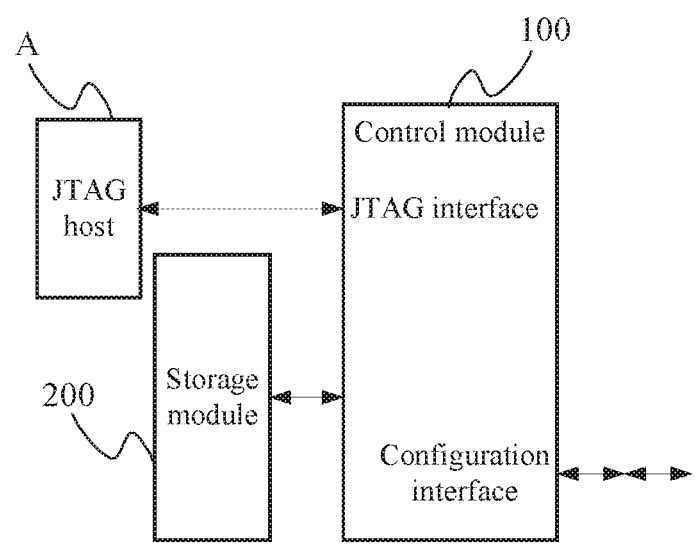
FIG. 2 is a schematic structural diagram showing connection of the apparatus for configuring or updating a programmable logic device according to the embodiment of the present disclosure with a JTAG host.
Figure 3:
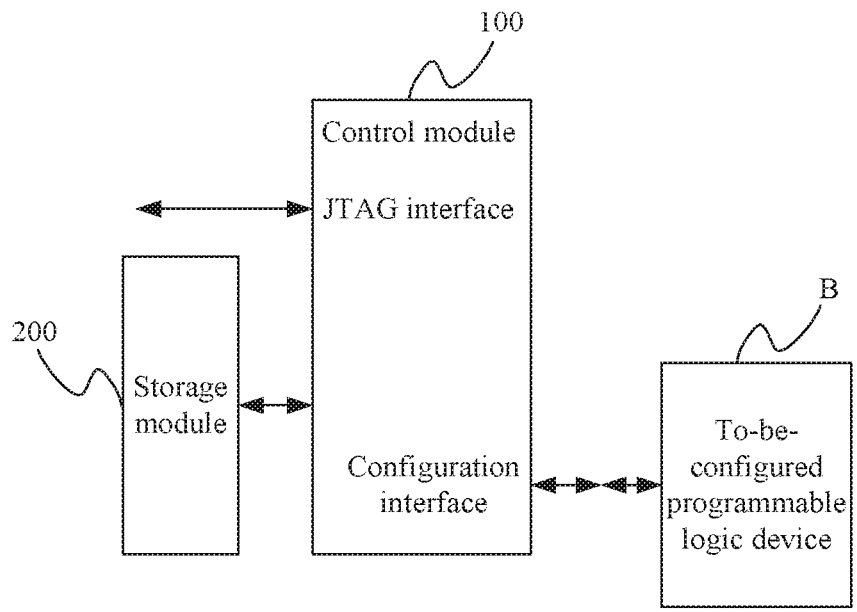
FIG. 3 is a schematic structural diagram showing connection of the apparatus for configuring or updating a programmable logic device according to the embodiment of the present disclosure with a to-be-configured programmable logic device.

It should be noted that, in a developing and debugging phase of the to-be-configured programmable logic device, the following processes are performed, as shown in FIG. 2 and FIG. 3. In FIG. 2, a JTAG host A is connected to the apparatus for configuring or updating a programmable logic device via the JTAG interface of the control module 100, the JTAG host A sends a first control instruction including configuration information to the control module 100 via the JTAG interface, and the control module 100 writes the configuration information to the storage module 200 in response to the first control instruction. The first control instruction herein includes a programming instruction sent by the JTAG host, where the programming instruction includes configuration information. It should be noted that, in a process that a programming (writing) operation is performed on the storage module 200, if the storage module 200 is implemented by a memory on which a blank check operation is required to be performed before being written, such as an SPI Flash memory, an NAND Flash memory or a NOR Flash memory, the blank check operation is required to be performed on the storage module 200 before the configuration information is written to the storage module 200. The blank check operation indicates a process in which information stored in the storage module 200 is firstly queried, a writing operation is then performed on the storage module 200 if the information stored in the storage module 200 is null, or the information stored in the storage module 200 is required to be erased and then the writing operation is performed on the storage module 200 if the information stored in the storage module 200 is not null.

In FIG. 3, the apparatus for configuring or updating a programmable logic device is connected with a to-be-configured programmable logic device B via the configuration interface of the control module 100, and the apparatus for configuring or updating a programmable logic device reads the configuration information to configure the to-be-configured programmable logic device B after receiving the configuration instruction.

The configuration instruction may be an instruction indicating system powered-on information (that is, the control module reads the configuration information to configure the to-be-configured programmable logic device B after the system is powered on), or may be triggered by a button provided on a circuit board of the apparatus for configuring or updating the programmable logic device after the system is powered on). The specific generation and transmission manner of the configuration instruction is not limited in the present disclosure, and depends on actual conditions.

Figure 4:
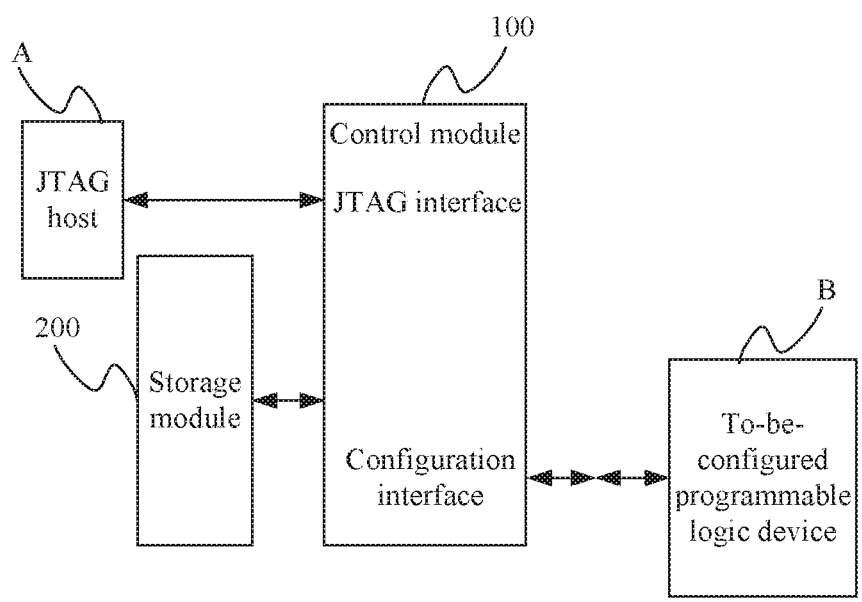
FIG. 4 is a schematic structural diagram showing connection of the apparatus for configuring or updating a programmable logic device according to the embodiment of the present disclosure with a JTAG host and a to-be-configured programmable logic device.

The apparatus for configuring or updating a programmable logic device may also be connected with both the JTAG host A and the to-be-configured programmable logic device B, as shown in FIG. 4.

In addition, in a process that the control module 100 performs data transmission on the to-be-configured programmable logic device B (that is, in a process that the control module configures the to-be-configured programmable logic device B), a configuration clock is generally required to cause the control module 100 and the to-be-configured programmable logic device B to operate in a synchronous manner. The to-be-configured programmable logic device B generally has an active configuration mode and a passive configuration mode. In a case that the programmable logic device is in the active configuration mode, the programmable logic device provides the configuration clock required in the configuration process and transmits the configuration clock to the control module 100, to realize clock synchronization between the to-be-configured programmable logic device B and the control module 100. In a case that the programmable logic device is in the passive configuration mode, the clock used by the control module and the to-be-configured programmable logic device may be generated from the control module 100 or an external clock source. In a case that the clock used by the control module and the to-be-configured programmable logic device is generated from the control module 100, the control module 100 provides a configuration clock and transmits the configuration clock to the to-be-configured programmable logic device B, to realize the clock synchronization between the to-be-configured programmable logic device B and the control module 100 in the configuration process. In a case that the clock used by the control module and the to-be-configured programmable logic device B is generated from an external clock source, the external clock source provides a configuration clock to the control module 100 and the to-be-configured logic device respectively via the configuration interface of the control module 100 and a connection node of the to-be-configured programmable logic device B, to realize clock synchronization between the to-be-configured programmable logic device B and the control module 100 in the configuration process.

The to-be-configured programmable logic device B may select to operate in the active configuration mode or the passive configuration mode by changing a level state of a pin of the to-be-configured programmable logic device. In this case, the control module 100 may determine whether to receive the configuration clock or transmit the configuration clock based on different level states of a corresponding pin of the control module.

In the apparatus for configuring or updating a programmable logic device, the JTAG host A may be implemented by a computer pre-installed with JTAG software, an FPGA, a Complex Programmable Logic Device (CPLD), a single chip microcomputer, a Digital Signal Processor (DSP), or other types of processors. The specific type of the JTAG host A is not limited in the present disclosure, and depends on actual situations.

In the present disclosure, the to-be-configured programmable logic device B is generally implemented by a Field-Programmable Gate Array (FPGA). In other embodiments of the present disclosure, the to-be-configured programmable logic device may also be implemented by a digital signal processor. The type of the to-be-configured programmable logic device B is not limited in the present disclosure, and depends on actual conditions.

It should further be noted that, since the configuration interface of the control module 100 is compatible with the to-be-configured programmable logic device B, the configuration information read by the control module may be converted into configuration information compatible with a configuration timing of the to-be-configured programmable logic device B and is then transmitted to the to-be-configured programmable logic device, to configure the to-be-configured programmable logic device, thereby solving the problem of poor usability of the to-be-configured programmable logic device B having a large capacity in the conventional technology, which is caused due to lack of a convenient and simple configuration memory compatible with a conventional configuration interface of the to-be-configured programmable logic device. The to-be-configured programmable logic device B having a large capacity herein is a programmable logic device requiring greater than 32 Mbit of configuration information.

Specifically, the problem of poor usability caused by the fact that the memory interface is incompatible with the timing of the configuration interface of the to-be-configured programmable logic device B includes problems such as the complicated circuit structure, lacking a convenient and simple JTAG debugging interface, and occupying a large number of pins of the to-be-configured programmable logic device B.

In the conventional technology, in order to solve the problem of poor usability, multiple memories each having a storage capacity less than or equal to 32 Mbit and having an interface compatible with the conventional configuration interface are usually used to configure or update the to-be-configured programmable logic device B. In this case, a large number of circuit components are required, which not only results in a complicated circuit structure, but also a large occupied area of the circuit board and a large weight of the system. The description for the conventional configuration interface herein may be found in UG002 (v2.2) "Virtex-II Platform FPGA User Guide", and a typical example of the conventional configuration interface may be found in UG002 (v2.2) "Virtex-II Platform FPGA User Guide" Chapter 4, pages 286-297, which are not described in detail herein.

In the case that the apparatus for configuring or updating a programmable logic device is used to configure or update the to-be-configured programmable logic device B, the multiple memories each having a storage capacity less than or equal to 32 Mbit are not required, avoiding the problem described above.

Based on the above embodiments, in an embodiment of the present disclosure, as shown in FIG. 2, in the case that the control module 100 is connected with the JTAG host A, the JTAG host A may further send a second control instruction to the control module 100 via the JTAG interface. After receiving the second control instruction, the control module 100 performs a reading or erasing operation on the storage module 200 in response to the second control instruction.

It should be noted that the second control instruction may be a reading instruction or an erasing instruction sent by the JTAG host A. In a case that the control module 100 receives the reading instruction sent by the JTAG host A, the control module performs the reading operation on the storage module 200 in response to the reading instruction sent by the JTAG host A. In a case that the control module 100 receives the erasing instruction sent by the JTAG host A, the control module performs the erasing operation on the storage module 200 in response to the reading instruction sent by the JTAG host A.

Figure 5:
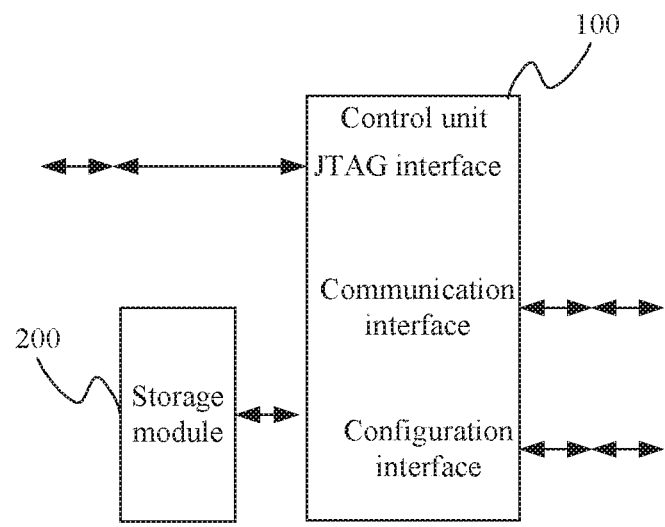
FIG. 5 is a schematic structural diagram of an apparatus for configuring or updating a programmable logic device according to a preferred embodiment of the present disclosure.

Based on the above embodiments, in a preferred embodiment of the present disclosure, as shown in FIG. 5, the control module 100 further includes a communication interface.

The communication interface is used for connecting the control module to an upper computer.

The control module 100 is further configured to: after receiving a third control instruction sent by the upper computer, perform storing, reading and erasing operations on the storage module 200 in response to the third control instruction.

Similarly, the third control instruction herein may be a programming instruction, a reading instruction or an erasing instruction sent by the upper computer. In a case that the control module 100 receives the reading instruction sent by the upper computer, the control module performs a reading operation on the storage module 200 in response to the reading instruction sent by the upper computer. In a case that the control module 100 receives the erasing instruction sent by the upper computer, the control module performs an erasing operation on the storage module 200 in response to the erasing instruction sent by the upper computer. In a case that the control module 100 receives the programming instruction sent by the upper computer, the control module performs a writing operation on the storage module 200 in response to the programming instruction sent by the upper computer.

Similarly, it should be noted that, in a process that a programming (writing) operation is performed on the storage module 200, if the storage module 200 is implemented by a memory on which a blank check operation is required to be performed before being written, such as an SPI Flash memory, an NAND Flash memory or a NOR Flash memory, the blank check operation is required to be performed on the storage module 200 before the configuration information is written to the storage module 200. The blank check operation indicates a process in which information stored in the storage module 200 is firstly queried, a writing operation is then performed on the storage module 200 if the information stored in the storage module 200 is null, or the information stored in the storage module 200 is required to be erased and then the writing operation is performed on the storage module 200 if the information stored in the storage module 200 is not null.

It should be noted that the upper computer herein is generally implemented by any electronic device that can be connected with the control module 100 via the communication interface and can send the third control instruction to the control module 100. In order to facilitate configuration or update of the to-be-configured programmable logic device B, in the debugging phase of the to-be-configured programmable logic device, the control module 100 is generally connected with the JTAG host A via the JTAG interface to erase and read configuration information from the storage module or write configuration information to the storage module, so as to configure or update the to-be-configured programmable logic device B. In addition, after the to-be-configured programmable logic device B is configured, in a usage stage of the to-be-configured programmable logic device, the control module 100 is generally connected with the upper computer via the communication interface, to perform the erasing, reading or writing operation on the storage module, so as to update the to-be-configured programmable logic device B. The communication interface can be connected with various types of upper computers C including the JTAG host A. and the JTAG interface can be connected with only the JTAG host A.

Figure 6:
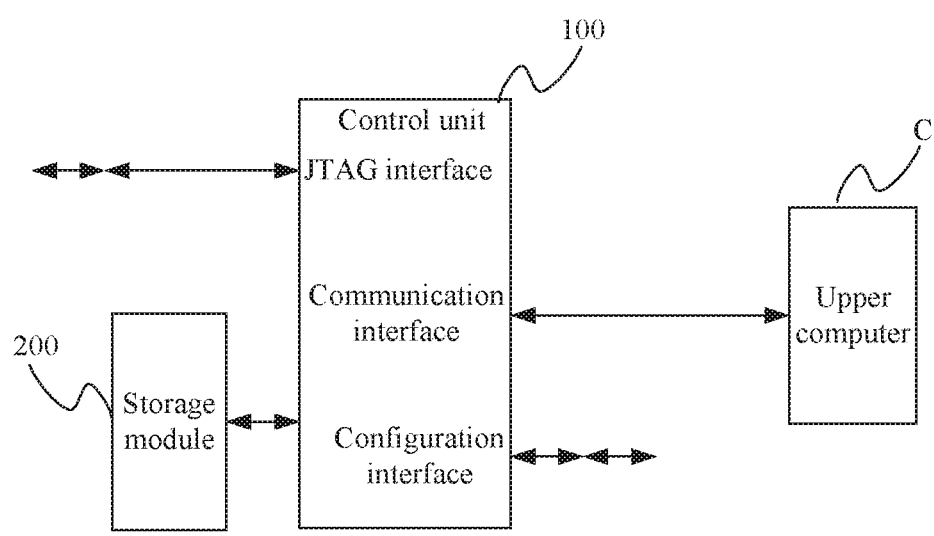
FIG. 6 is a schematic structural diagram showing connection of the apparatus for configuring or updating a programmable logic device according to the preferred embodiment of the present disclosure with an upper computer.

In this embodiment, as shown in FIG. 6, in the case that the communication interface is connected with the upper computer C, the upper computer C may send a third control instruction to the control module 100 via the communication interface, so as to perform writing, reading, and erasing operations on the storage module 200. In this way, with the apparatus for configuring or updating a programmable logic device, the configuration information can be written or updated to the storage module 200 by using not only the JTAG host A but also the upper computer C, so that the control module 100 can configure and update the to-be-configured programmable logic device B after being powered on again.

Figure 7:
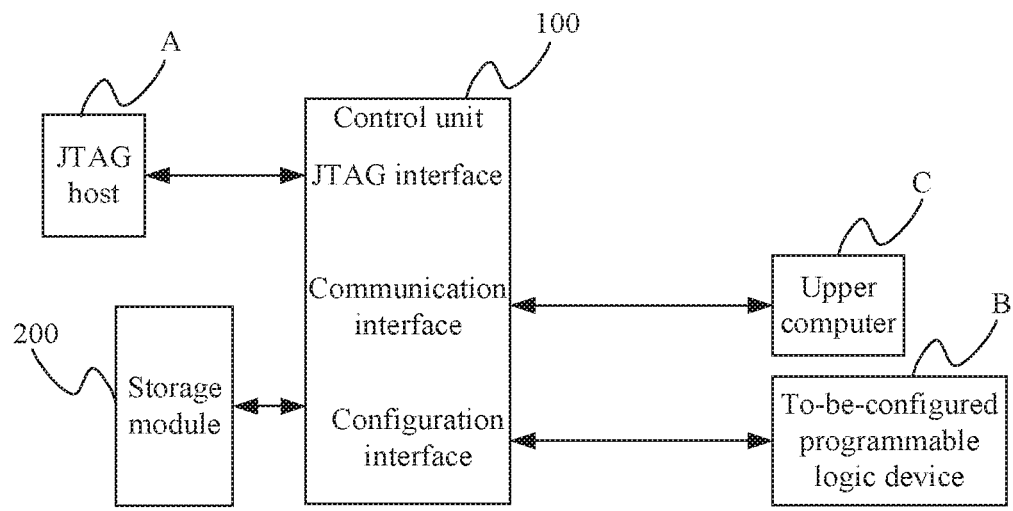
FIG. 7 is a schematic structural diagram showing connection of the apparatus for configuring or updating a programmable logic device according to the preferred embodiment of the present disclosure with an upper computer, a JTAG host, and a to-be-configured programmable logic device.

Similarly, as shown in FIG. 7, the apparatus for configuring or updating a programmable logic device may also be connected to all three devices including the JTAG host A, the upper computer C, and the to-be-configured programmable logic device B.

It should be noted that the upper computer C may be implemented by an FPGA, a CPLD, a single chip microcomputer, a DSP, or other types of processors. The type of the upper computer C is not limited in the present disclosure, and depends on actual situations.

The communication interface may be implemented by a Serial Peripheral Interface (SPI) bus interface, an IC bus interface, or a Universal Asynchronous Receiver/Transmitter (UART) bus interface. The specific type of the communication interface is not limited in the present disclosure, and depends on actual conditions.

Figure 8:
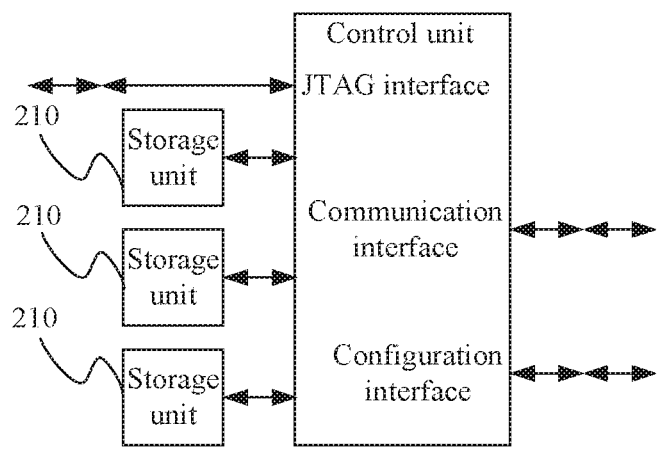
FIG. 8 is a schematic structural diagram of an apparatus for configuring or updating a programmable logic device according to another preferred embodiment of the present disclosure.

Based on the above embodiments, in another preferred embodiment of the present disclosure, as shown in FIG. 8, the storage module 200 includes three storage units 210.

The control module 100 performs a same operation on the storage units 210.

The control module 100 further includes a triple modular redundancy voting circuit.

The triple modular redundancy voting circuit is configured to: perform a triple modular redundancy operation on data outputted by the three storage units 210, and output mostly same data in the data outputted by the three storage units 210 as a reading result of the control module 100.

In this embodiment, after the triple modular redundancy voting circuit performs the triple modular redundancy operation on the data outputted by the three storage units 210 and obtains the reading result (i.e., configuration information), the control module 100 transmits the configuration information to the configuration interface, and then simulates a configuration timing of the to-be-configured programmable logic device B at the configuration interface, so as to perform configuring or program updating on the to-be-configured programmable logic device B by using the configuration information.

It should be noted that, in this embodiment, the storage module 200 is provided with the three storage units 210, and the triple modular redundancy voting circuit is provided in the control module 100, to improve the reliability of the data (configuration information) read by the apparatus for configuring or updating a programmable logic device, so as to meet high reliability requirements of certain application fields (such as industrial, military and aerospace fields).

Figure 9:
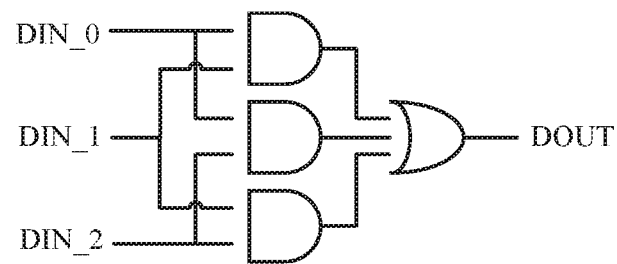
FIG. 9 is a schematic structural diagram of a triple modular redundancy voting circuit according to an embodiment of the present disclosure.

A feasible triple modular redundancy voting circuit is provided according to an implementation of the present disclosure, which is shown in FIG. 9. Reference numerals DIN_1, DIN_2 and DIN_3 in FIG. 9 indicate input terminals of the triple modular redundancy voting circuit, which are respectively connected to data output terminals of the three storage units 210. A reference numeral DOUT in FIG. 9 indicates an output terminal of the triple modular redundancy voting circuit.

Based on the above embodiments, in another embodiment of the present disclosure, the storage unit 210 may be implemented by an SPI Flash memory, a BPI Flash memory, an NAND Flash memory, or a programmable read-only memory PROM. The specific type of the storage unit 210 is not limited in the present disclosure, and depends on actual conditions.

Based on the above embodiments, in a preferred embodiment of the present disclosure, the control module 100 is further configured to: after receiving a configuration completion signal transmitted by the to-be-configured programmable logic device B, control the storage module 200 to operate in a low power mode or an idle mode, so as to reduce power consumption of the apparatus for configuring or updating a programmable logic device.

It should be noted that, in this embodiment, during a process that the storage module 200 operates in the low power mode or the idle mode, the control module 100 may still be connected with the JTAG host A via the JTAG interface, and the JTAG host A may send the first control instruction or the second control instruction to the control module 100, so as to perform the storing, reading and erasing operations on the storage module 200.

Similarly, during the process that the storage module 200 operates in the low power mode or the idle mode, the control module 100 may still be connected with the upper computer C via the communication interface, and the upper computer C may send the third control instruction to the control module 100, so as to perform the storing, reading, and erasing operations on the storage module 200.

Figure 10:
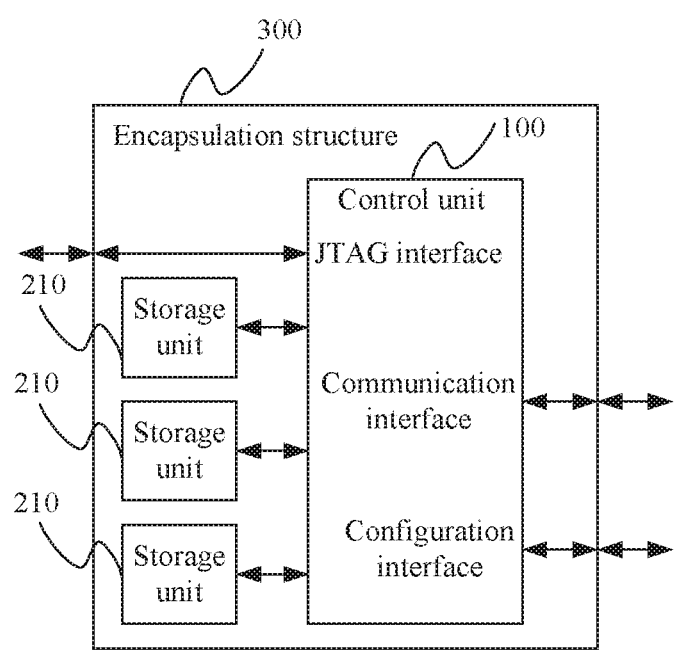
FIG. 10 is a schematic structural diagram of an apparatus for configuring or updating a programmable logic device according to an embodiment of the present disclosure.

Based on any one of the above embodiments, in an embodiment of the present disclosure, as shown in FIG. 10, the apparatus for configuring or updating a programmable logic device further includes an encapsulation structure 300.

The encapsulation structure 300 is configured to encapsulate the storage module 200 and the control module 100.

It should be noted that the encapsulation structure 300 includes an input and output module configured to lead out external interfaces of the control module 100. In an embodiment of the present disclosure, the external interfaces of the control module 100 include the configuration interface and the JTAG interface. In another embodiment of the present disclosure, the external interfaces of the control module 100 include the communication interface, the configuration interface, and the JTAG interface.

Based on any one of the above embodiments, in another embodiment of the present disclosure, the control module 100 is implemented by an Application Specific Integrated Circuit (ASIC) chip or a programmable logic device chip. The specific implementation manner of the control module 100 is not limited in the present disclosure, and depends on actual conditions.

Figure 11:
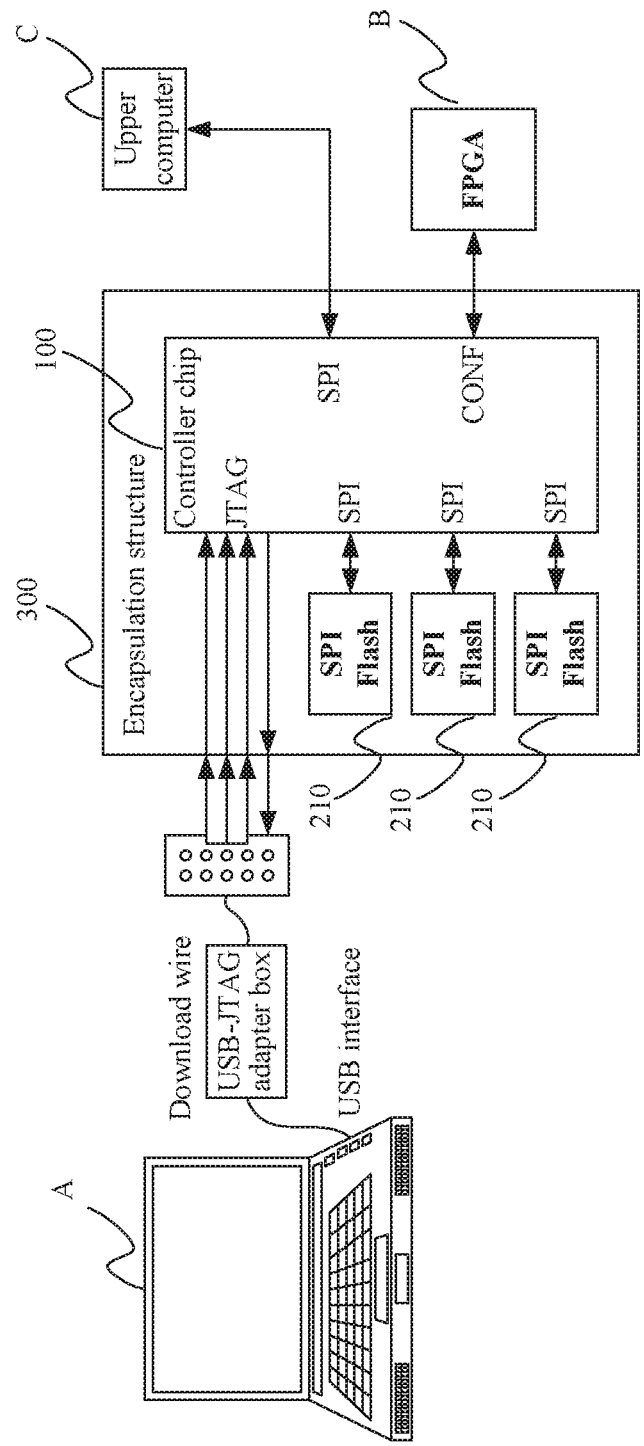
FIG. 11 is a schematic diagram showing a structure of an apparatus for configuring or updating a programmable logic device according to another embodiment of the present disclosure and connection of the apparatus for configuring or updating a programmable logic device with a JTAG host, an upper computer, and a to-be-configured programmable logic device.

Based on the above embodiments, reference is made to FIG. 11, which shows a specific structure of an apparatus for configuring or updating a programmable logic device according to an embodiment of the present disclosure and connection of the apparatus for configuring or updating a programmable logic device with a JTAG A and an upper computer C. In this embodiment, the storage unit 210 is implemented by an SPI Flash chip. In this case, an interface of the control module 100 corresponding to the storage unit 210 is defined by the storage unit as an SPI interface. The communication interface is an SPI interface. In the developing and debugging phase of the to-be-configured programmable logic device B, a computer having a USB interface and pre-installed with JTAG software may be used as the JTAG host A. The JTAG host A is connected to the JTAG interface of the control module 100 via a download wire and a corresponding plug. The download wire is formed by a USB cable, a JTAG cable, and a USB-to-JTAG conversion circuit. The control module 100 may perform reading, writing and erasing operations on the data in the three storage units 210 by using the JTAG software pre-installed in the JTAG host A. After the apparatus for configuring or updating a programmable logic device is connected to the to-be-configured programmable logic device B via the configuration interface and is powered on, the control module 100 automatically reads the data in the three storage units 210, performs two-out-of-three voting on three sets of data to obtain a voting result, and the control module 100) transmits the voting result as configuration information to the to-be-configured programmable logic device B at the configuration interface in accordance with the configuration timing of the to-be-configured programmable logic device B. In this way, power-on configuration of the to-be-configured programmable logic device B is completed. After the power-on configuration of the to-be-configured programmable logic device B is completed, the upper computer C operating together with the to-be-configured programmable logic device B may still perform the reading, writing and erasing operations on the data in the three storage units 210 by means of the control module 100, so as to update and upgrade functions of the to-be-configured programmable logic device B.

In summary, an apparatus for configuring or updating a programmable logic device is provided according an embodiment of the present disclosure. The apparatus for configuring or updating a programmable logic device includes a control module 100 and a storage module 200 connected to the control module 100. After the control module 100 receives a first control instruction including configuration information via a JTAG interface, the control module stores the configuration information into the storage module 200. Since a configuration interface of the control module 100 is compatible with a configuration interface of the to-be-configured programmable logic device B, the configuration information read by the control module can be converted into configuration information compatible with a configuration timing of the to-be-configured programmable logic device B and is then transmitted to the to-be-configured programmable logic device, to configure the to-be-configured programmable logic device B, thereby solving the problem of poor usability of a to-be-configured programmable logic device having a large capacity in the conventional technology, which is caused due to a large difference between an interface of a memory used for configuring or updating the to-be-configured programmable logic device having a large capacity and a conventional configuration interface.

Further, with the apparatus for configuring or updating a programmable logic device, multiple memories each having a storage capacity less than or equal to 32 Mbit are not required in a process that the to-be-configured programmable logic device B is configured or updated, thereby solving the problems of a large number of circuit components, a complicated circuit structure, a large occupied area of a circuit board, and a large weight of a system.

A method for configuring or updating a programmable logic device is further provided according to an embodiment of the present disclosure. The apparatus for configuring or updating a programmable logic device according to any one of the above embodiments may configure and update a to-be-configured programmable logic device B by using the method.

Figure 12:
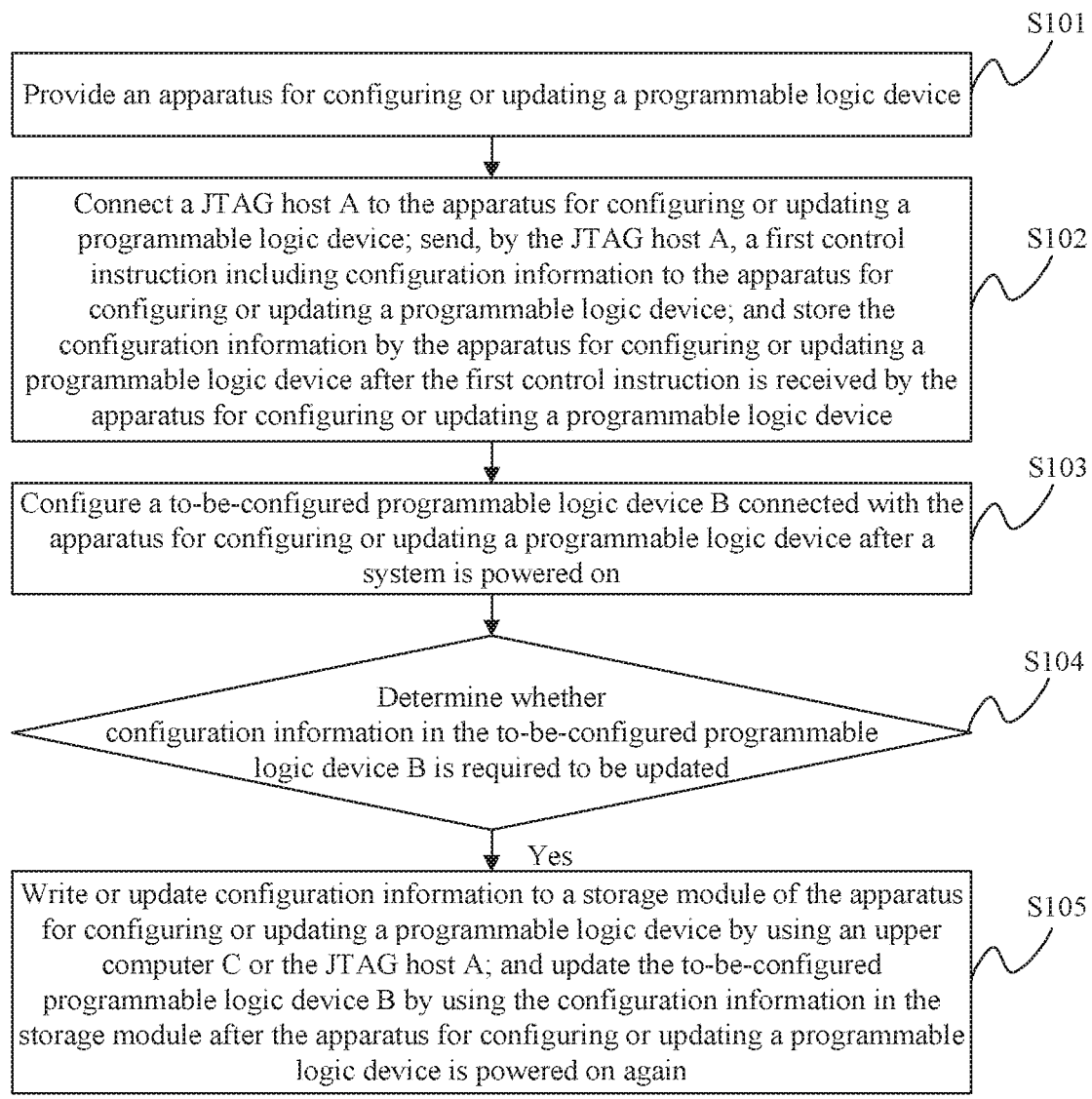
FIG. 12 is a schematic flowchart of a method for configuring or updating a programmable logic device according to an embodiment of the present disclosure.

Specifically, in an embodiment of the present disclosure, as shown in FIG. 12, the method for configuring or updating a programmable logic device includes the following steps S101 to S105.

In S101, an apparatus for configuring or updating a programmable logic device is provided, which may be implemented by the apparatus for configuring or updating a programmable logic device according to any one of the above embodiments.

In S102, a JTAG host A is connected to the apparatus for configuring or updating a programmable logic device, the JTAG host A sends a first control instruction including configuration information to the apparatus for configuring or updating a programmable logic device, and the apparatus for configuring or updating a programmable logic device stores the configuration information after receiving the first control instruction.

In S103, after a system is powered on, a to-be-configured programmable logic device B connected with the apparatus for configuring or updating a programmable logic device is configured.

In S104, it is determined whether configuration information in the to-be-configured programmable logic device B is required to be updated. If it is determined that the configuration information in the to-be-configured programmable logic device B is required to be updated, the method proceeds to S105.

In S105, configuration information is written or updated to a storage module of the apparatus for configuring or updating a programmable logic device by using an upper computer C or the JTAG host A; and after the apparatus for configuring or updating a programmable logic device is powered on again, the to-be-configured programmable logic device B is updated by using the configuration information in the storage module.

It should be noted that, in a process that the apparatus for configuring or updating a programmable logic device stores the configuration information after receiving the first control instruction in step S102, if a storage module in the apparatus for configuring or updating a programmable logic device is implemented by a memory on which a blank check operation is required to be performed before being written, such as an SPI Flash memory, an NAND Flash memory or a NOR Flash memory, the blank check operation is required to be performed on the storage module before the configuration information is written to the storage module. The blank check operation indicates a process in which information stored in the storage module is firstly queried, a writing operation is then performed on the storage module if the information stored in the storage module is null, or the information stored in the storage module is required to be erased and then the writing operation is performed on the storage module if the information stored in the storage module is not null.

Specifically, the process of updating the to-be-configured programmable logic device B by using the upper computer C connected with the apparatus for configuring or updating a programmable logic device may be performed as follows.

The upper computer C sends a third control instruction to the apparatus for configuring or updating a programmable logic device, and the control module 100 of the apparatus for configuring or updating a programmable logic device updates configuration information in the storage module 200 of the apparatus for configuring or updating a programmable logic device in response to the third control instruction. After the to-be-configured programmable logic device B connected with the apparatus for configuring or updating a programmable logic device is powered on again, the control module 100 automatically reads the updated configuration information to configure the to-be-configured programmable logic device B, so as to update the to-be-configured programmable logic device B.

Similarly, the process of updating the to-be-configured programmable logic device B by using the JTAG host A connected with the apparatus for configuring or updating a programmable logic device is similar to the process of updating the to-be-configured programming logic device B by using the upper computer C, which is not described in detail herein.

In summary, an apparatus and a method for configuring or updating a programmable logic device are provided according the embodiments of the present disclosure. The apparatus for configuring or updating a programmable logic device includes a control module 100 and a storage module 200 connected to the control module 100. After the control module 100 receives a first control instruction including configuration information via a JTAG interface, the control module writes the configuration information to the storage module 200. Since a configuration interface of the control module 100 is compatible with a configuration interface of the to-be-configured programmable logic device B, the configuration information read by the control module can be converted into configuration information compatible with a configuration timing of the to-be-configured programmable logic device B and is then transmitted to the to-be-configured programmable logic device, to configure the to-be-configured programmable logic device B, thereby solving the problem of poor usability of a to-be-configured programmable logic device having a large capacity in the conventional technology, which is caused due to a large difference between an interface of a memory used for configuring or updating the to-be-configured programmable logic device having a large capacity and a conventional configuration interface.

Further, with the apparatus for configuring or updating a programmable logic device, multiple memories each having a storage capacity less than or equal to 32 Mbit are not required in a process that the to-be-configured programmable logic device B is configured or updated, thereby solving the problems of a large number of circuit components, a complicated circuit structure, a large occupied area of a circuit board, and a large weight of a system.

The embodiments in this specification are described in a progressive way, each of the embodiment lays emphasizes differences from other embodiments, and the same or similar parts among the embodiments can be referred to each other.

Based on the above description of the disclosed embodiments, those skilled in the art can implement or carry out the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. An apparatus for configuring or updating a programmable logic device, the apparatus comprising:
a control module; and
a storage module connected to the control module, wherein:
the control module comprises: a JTAG interface for connecting the control module to a JTAG host, and a configuration interface compatible with a to-be-configured programmable logic device, wherein the to-be-configured programmable logic device is a large capacity programmable logic device;
the control module is configured to: after receiving a first control instruction comprising configuration information via the JTAG interface, store the configuration information into the storage module; and after receiving a configuration instruction, read the configuration information, and convert the configuration information into configuration information compatible with a configuration timing of the to-be-configured programmable logic device and transmit the converted configuration information to the to-be-configured programmable logic device, to configure the to-be-configured programmable logic device; and
a configuration clock is used in a process that the control module configures the to-be-configured programmable logic device;
when the configuration instruction is actively generated by the to-be-configured programmable logic device, the configuration clock is generated from the to-be-configured programmable logic device and sent to the control module to realize clock synchronization between the to-be-configured programmable logic device and the control module.

2. The apparatus for configuring or updating the programmable logic device according to claim 1, wherein the control module is further configured to perform a reading or erasing operation on the storage module in response to a second control instruction sent by the JTAG host.

3. The apparatus for configuring or updating the programmable logic device according to claim 1, wherein the control module further comprises a communication interface for connecting the control module to an upper computer, and
the control module is further configured to: after receiving a third control instruction sent by the upper computer, perform storing, reading, and erasing operations on the storage module in response to receiving the third control instruction;
wherein the communication interface is different from the JTAG interface, and the upper computer is different from the JTAG host.

4. The apparatus for configuring or updating the programmable logic device according to claim 3, wherein the communication interface is implemented by a serial peripheral interface (SPI) bus interface or an Inter-Integrated Circuit (IIC) bus interface or a universal asynchronous receiver/transmitter (UART) bus interface.

5. The apparatus for configuring or updating the programmable logic device according to claim 3, wherein:
the third control instruction is configured to instruct the control module to update the configuration information stored in the storage module, and
the control module automatically reads the configuration information stored in the storage module, to configure the to-be-configured programmable logic device, when the to-be-configured programmable logic device is powered on.

6. The apparatus for configuring or updating the programmable logic device according to claim 1, wherein:
the storage module comprises three storage units;

the control module is configured to perform a same operation on the three storage units;

the control module further comprises a triple modular redundancy voting circuit; and the triple modular redundancy voting circuit is configured to: perform a triple modular redundancy operation on data outputted by the three storage units, and output mostly same data in the data outputted by the three storage units as a reading result of the control module.

7. The apparatus for configuring or updating the programmable logic device according to claim 6, wherein each storage unit of the three storage units is implemented by a serial peripheral interface (SPI) Flash memory or a Byte Peripheral Interface (BPI) Flash memory or an NAND Flash memory or a programmable read-only memory (PROM).

8. The apparatus for configuring or updating the programmable logic device according to claim 1, wherein the control module is further configured to: after receiving a configuration completion signal which indicates configuration of the to-be-configured programmable logic device is completed and which is transmitted by the to-be-configured programmable logic device, control the storage module to operate in a low power mode or an idle mode.

9. The apparatus for configuring or updating the programmable logic device according to claim 1, the apparatus further comprising:
an encapsulation structure configured to encapsulate the storage module and the control module.

10. The apparatus for configuring or updating the programmable logic device according to claim 1, wherein the control module is implemented by an application specific integrated circuit (ASIC) chip or a complex programmable logic device (CPLD) chip.

11. The apparatus for configuring or updating the programmable logic device according to claim 1, wherein the control module is configured to:
determine whether information stored on the storage module is null;
perform a writing operation on the storage module, in response to determining that the information stored on the storage module is null; and
erase the information stored on the storage module and then perform a writing operation on the storage module, in response to determining that the information stored on the storage module is not null.

12. The apparatus for configuring or updating the programmable logic device according to claim 1, wherein:
when the configuration instruction is passively received by the to-be-configured programmable logic device, the configuration clock is generated from an external clock source other than the control module and sent to both the control module and the to-be-configured programmable logic device.

13. A method for configuring or updating a programmable logic device, the method comprising:
providing an apparatus for configuring or updating the programmable logic device, wherein the apparatus comprises a control module and a storage module connected to the control module, and the control module comprises a JTAG interface for connecting the control module to a JTAG host, and a configuration interface compatible with a to-be-configured programmable logic device, and wherein the to-be-configured programmable logic device is a large capacity programmable logic device;
connecting the JTAG host to the apparatus via the JTAG interface;
sending, by the JTAG host, a first control instruction comprising configuration information to the apparatus for configuring or updating the programmable logic device; and storing, by the apparatus, the configuration information into the storage module in response to the apparatus receiving the first control instruction; and
in response to the apparatus receiving a configuration instruction:
reading, by the apparatus, the configuration information,
converting, by the apparatus, the configuration information into configuration information compatible with a configuration timing of the to-be-configured programmable logic device, and
transmitting, by the apparatus, the converted configuration information to the to-be-configured programmable logic device, to configure the to-be-configured programmable logic device connected with the apparatus for configuring or updating the programmable logic device;
wherein a configuration clock is used in a process that the apparatus configures the to-be-configured programmable logic device;
when the configuration instruction is actively generated by the to-be-configured programmable logic device, the configuration clock is generated from the to-be-configured programmable logic device and sent to the control module to realize clock synchronization between the to-be-configured programmable logic device and the control module.

* * * * *